United States Patent
Ibragimov et al.

(10) Patent No.: US 8,565,621 B2
(45) Date of Patent: Oct. 22, 2013

(54) QUADRATURE TIME SKEW DETECTION FOR COHERENT OPTICAL SIGNALS

(75) Inventors: Edem Ibragimov, Santa Clara, CA (US); Sunil Kumar Singh Khatana, Sunnyvale, CA (US)

(73) Assignee: Opnext Subsystems, Inc., San Jose, CA (US)

( * ) Notice: Subject to any disclaimer, the term of this patent is extended or adjusted under 35 U.S.C. 154(b) by 172 days.

(21) Appl. No.: 13/243,885

(22) Filed: Sep. 23, 2011

(65) Prior Publication Data

US 2012/0224847 A1 Sep. 6, 2012

Related U.S. Application Data

(60) Provisional application No. 61/448,105, filed on Mar. 1, 2011.

(51) Int. Cl.
    H04B 10/00 (2013.01)
(52) U.S. Cl.
    USPC ........... 398/205; 398/204; 398/206; 398/208; 398/211
(58) Field of Classification Search
    USPC .................................. 398/202–214
    See application file for complete search history.

(56) References Cited

U.S. PATENT DOCUMENTS

| | | | |
|---|---|---|---|
| 7,970,290 B2 * | 6/2011 | Tao et al. | 398/202 |
| 8,233,797 B2 * | 7/2012 | Qian et al. | 398/67 |
| 8,306,431 B2 * | 11/2012 | Takahara | 398/152 |
| 8,315,528 B2 * | 11/2012 | Roberts et al. | 398/208 |
| 8,355,637 B2 * | 1/2013 | Sano et al. | 398/204 |
| 2006/0013596 A1 * | 1/2006 | Lazaro Villa et al. | 398/187 |
| 2008/0205905 A1 * | 8/2008 | Tao et al. | 398/204 |
| 2011/0229127 A1 * | 9/2011 | Sakamoto et al. | 398/25 |
| 2012/0051756 A1 * | 3/2012 | Grobe | 398/184 |
| 2012/0070149 A1 * | 3/2012 | Chung et al. | 398/65 |
| 2012/0099864 A1 * | 4/2012 | Ishihara et al. | 398/65 |
| 2012/0189318 A1 * | 7/2012 | Mo et al. | 398/152 |
| 2012/0189320 A1 * | 7/2012 | Zelensky et al. | 398/158 |
| 2012/0213510 A1 * | 8/2012 | Stojanovic | 398/25 |
| 2012/0224847 A1 * | 9/2012 | Ibragimov et al. | 398/16 |

FOREIGN PATENT DOCUMENTS

| | | |
|---|---|---|
| EP | 2221999 A1 | 8/2010 |
| JP | 2009219097 A | 9/2009 |

OTHER PUBLICATIONS

Fludger et al., "Characterization of an RZ-DQPSK transmitter using coherent detection", Handbook of optical constants of solids, E.D. Palik, ed. (Academic, Orlando, FL 1985), 2 pages.

Tanimura et al., "A Simple Digital Skew Compensator for Coherent Receiver," ECOC 2009, Sep. 20-24, 2009, Vienna, Austria, 2 pages.

Authorized Officer Hannelore Filip, International Search Report/Written Opinion in International Application No. PCT/US2012/026789, mailed Jul. 20, 2012, 12 pages.

* cited by examiner

*Primary Examiner* — Agustin Bello
(74) *Attorney, Agent, or Firm* — Fenwick & West LLP

(57) ABSTRACT

A method for detecting and measuring time skew in high-speed DP-QPSK coherent optical receivers is described.

14 Claims, 4 Drawing Sheets

QUADRATURE TIME SKEW DETECTION FOR COHERENT OPTICAL SIGNALS

CROSS REFERENCE TO RELATED APPLICATIONS

This specification claims priority under 35 U.S.C. §119(e) to U.S. Provisional Application No. 61/448,105 entitled "Quadrature time skew detection for coherent optical signals" and filed Mar. 1, 2011, the entire disclosure of which is incorporated herein by reference.

TECHNICAL FIELD

The disclosure is generally related to optical communications systems and in particular to time skew detection in high-speed, optical coherent receivers.

BACKGROUND

Next-generation long-haul, fiber-optic communications systems are being designed to operate at 100 gigabits per second over distances of 1,000 kilometers or more. Coherent optical receivers have been proposed as an alternative to conventional direct detection receivers for high-speed, fiber-optic systems because, among other reasons, they recover the phase of optical electric fields. When in-phase (I) and quadrature (Q) components of an optical signal are known, exact equalization of linear channel impairments is possible in principle and the effects of nonlinear impairments may be reduced.

Time "skew" in a coherent optical communications system refers to timing misalignment between data sent in I and Q channels of the system. Ideally, high-speed data bits in I and Q arrive at a receiver synchronized. In practice, however, data in I may arrive slightly ahead or behind data in Q and the data are said to be "skewed". Best receiver performance, e.g. lowest bit-error rate, is obtained when skew is minimized. However, before skew can be corrected, it must first be detected and measured.

DETAILED DESCRIPTION

This specification describes methods to detect skew in a high-speed, coherent optical receiver. The disclosed methods permit measurement of both the sign and magnitude of time skew between I and Q components of an ultra-high speed (e.g., >1 Gb/s) QPSK optical signal. In a 32 Gb/s optical test system skew was measured with picosecond resolution over a range of up to one-half of a bit period. Skew measurement is based on a correlation of filtered I and Q signals produced when a known test signal is received.

In coherent optical systems, laser phase noise and the frequency offset between an optical signal carrier and an optical local oscillator (LO) lead to received signals having upper and lower sidebands that prevent obtaining useful results by simply correlating I and Q after detection and sampling. Filtering the signals to remove one of the sidebands, however, leads to a correlation that is a function of skew.

Figure 1:
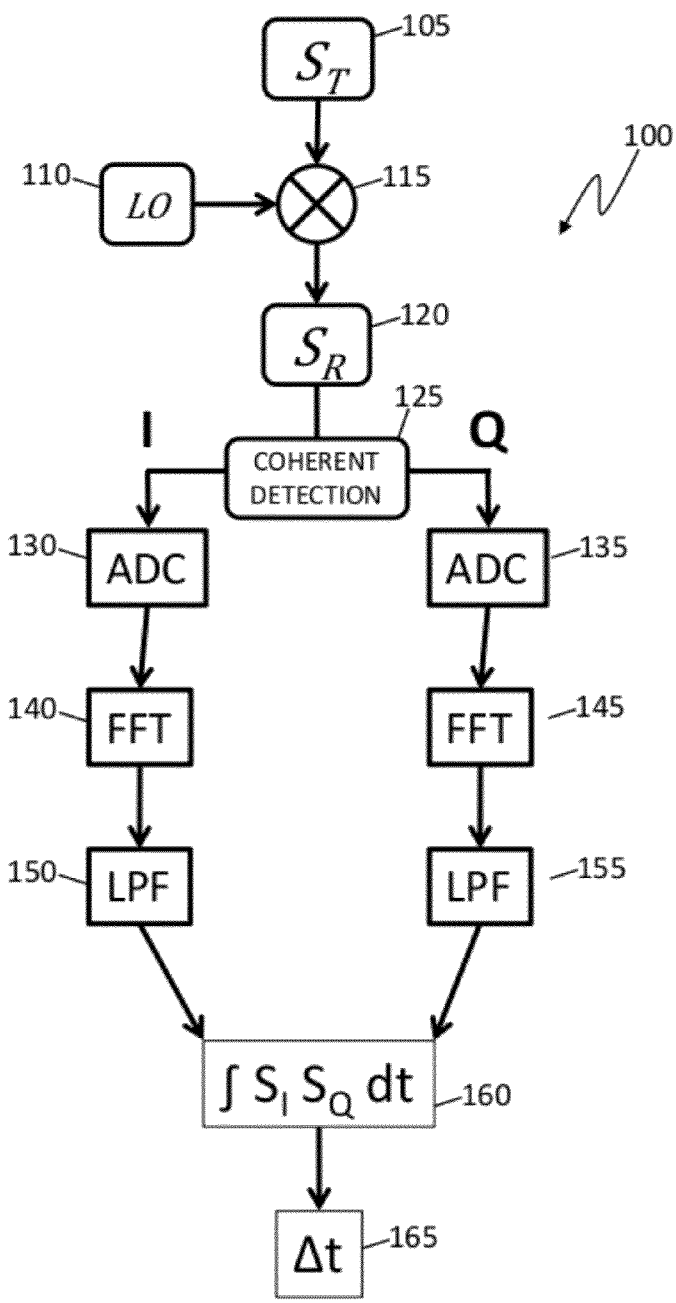
FIG. 1 is a schematic diagram of a system and method used to measure skew between quadrature components of a high-speed quadrature phase shift keying (QPSK) optical signal.

FIG. 1 is a schematic diagram of method 100 for measuring skew between quadrature components of a high-speed QPSK optical signal. In FIG. 1, transmitted optical signal 105, $S_T = s(t)e^{-i\omega_T t}$, is mixed 115 with a local oscillator (LO) signal 110, $e^{i\omega_{LO} t}$, to generate a received optical signal 120, $S_R = s(t)e^{i(\Delta\omega t + \phi)}$. Here s(t) is a test data signal, $\omega_T$ is the transmitter carrier frequency, $\omega_{LO}$ is the local oscillator frequency, $\Delta\omega = \omega_{LO} - \omega_T$ is the difference between the LO and transmitter frequencies, and $\phi$ is the phase difference between the transmitter and LO signals. Test signal s (t) can be forced to be real (i.e. not complex) by sending it in only one of the quadrature components.

After detection 125, the in-phase ($S_I$) and quadrature ($S_Q$) components of the received signal are:

$$s_I = Re\{S_R\} = s(t)\cos(\Delta\omega t + \phi) \quad (1)$$

$$s_Q = Im\{S_R\} = s(t+\Delta t)\sin(\Delta\omega(t+\Delta t)+\phi) \quad (2)$$

where $\Delta t$ is the time skew between the in-phase (I) and quadrature (Q) data signals. These signals are digitized by analog-to-digital conversion (ADC) 130 and 135.

Now suppose that the test data is sinusoidal such that $s(t) = \sin(\omega_s t)$; then:

$$s_I = \sin(\omega_s t)\cos(\Delta\omega t + \phi) \quad (3)$$

$$s_Q = \sin(\omega_s(t+\Delta t))\sin(\Delta\omega(t+\Delta t)+\phi) \quad (4)$$

which may be rewritten using trigonometric identities as:

$$s_I = \tfrac{1}{2}\{\sin[(\omega_s - \Delta\omega)t - \phi] + \sin[(\omega_s + \Delta\omega)t + \phi]\} \quad (5)$$

$$s_Q = \tfrac{1}{2}\{\cos[(\omega_s - \Delta\omega)t + (\omega_s - \Delta\omega)\Delta t - \phi] - \cos[(\omega_s + \Delta\omega)t + (\omega_s + \Delta\omega)\Delta t + \phi]\} \quad (6)$$

$S_I$ and $S_Q$ (equations (5) and (6)) each have lower ($\omega_s - \Delta\omega$) and upper ($\omega_s + \Delta\omega$) sideband components. Fast Fourier transforms (FFT) 140 and 145 identify these frequency components and digital low-pass filtering (LPF) 150 and 155 removes the high-frequency (i.e. upper sideband) terms leaving:

$$s_I = \tfrac{1}{2}\{\sin[(\omega_s - \Delta\omega)t - \phi]\} \quad (7)$$

$$s_Q = \tfrac{1}{2}\{\cos[(\omega_s - \Delta\omega)t + (\omega_s - \Delta\omega)\Delta t - \phi]\} \quad (8)$$

In an alternative implementation, high-pass filtering may be used to remove the low-frequency terms in equations (5) and (6) instead of the high-frequency terms. Filtering leaves $S_I$ and $S_Q$ each with just one frequency before correlation.

Correlation 160 of $S_I$ and $S_Q$ gives:

$$\frac{1}{T}\int_{-\infty}^{\infty} \sin[(\omega_s - \Delta\omega)t - \phi]\cos[(\omega_s - \Delta\omega)t + (\omega_s - \Delta\omega)\Delta t - \phi]\,dt = -\frac{1}{2}\sin((\omega_s - \Delta\omega)\Delta t). \quad (9)$$

In equation (9) T is the period of the sine function. Correlation (9) may be performed in either the time or frequency domain.

The skew 165 between I and Q may therefore be written:

$$\Delta t = \left(\frac{1}{(\omega_s - \Delta\omega)}\right)\sin^{-1}\left\{\frac{2}{T}\int_{-\infty}^{\infty} S_I S_Q \, dt\right\} \quad (10)$$

where $S_I$ and $S_Q$ are in-phase and quadrature components of a received test signal after filtering to ensure each has just one frequency component. $\Delta\omega$ may be estimated as half the distance between tone peaks in the Fourier transform of either $S_I$ or $S_Q$ before filtering (equations (5) and (6)). In an alternative implementation, $\Delta\omega$ may be neglected. Both the sign and magnitude of skew $\Delta t$ may be determined from the correlation of filtered frequency components. The method of FIG. 1 may be applied to each polarization independently in a polarization multiplexed QPSK system.

In the example above s(t) is a pure sinusoidal signal. More generally, however, any periodic signal may be represented as a superposition of sinusoids. Thus, as long as s(t) has a dominant frequency component that can be identified, the method above may be used.

A sinusoidal signal may be generated by using a periodic data pattern (e.g. 10101010101010101010 . . . ) in an initialization or test data sequence. For convenience the frequency of such a signal may be divided by N if "1" and "0" bits are repeated N times while the bit rate remains constant. For example, the frequency of a test pattern may be divided by N=2 by sending: 11001100110011001100 . . . . In general an optical QPSK test signal may be constructed from a pattern of 0 and 1 bits, where the period of the pattern is an integer (1, 2, 3, 4, etc.) times the bit period.

When the skew between I and Q is greater than one bit period, low frequency data patterns, e.g. N=2, 3, 4 . . . , may be used for coarse skew estimation and correction. The frequency of the test data may then be increased, i.e. N=1, for precise measurements and fine skew adjustment. Hence, a two-part procedure may be used where multi-bit-period skew can be measured with a test signal having a period longer than twice its bit period, and then sub-bit-period skew can be measured with a test signal having a period equal to twice its bit period. An example of such two-part procedure used to measure and adjust the skew in a communication system is described below in connection with FIG. 4.

One exemplary source of test signals is a CW optical source modulated by a (nominal) 67% optical return-to-zero (RZ) modulator (an "RZ carver"). A CW source and 67% RZ carver produce an alternating-phase, 67% duty cycle, periodic pattern which may be used for $S_T$ in the methods described in this specification. Measurements of bit-error-rate versus I-Q time skew in X and Y polarizations when using a 67% RZ carver as a signal source were performed using the system shown in FIG. 2 and are presented in FIGS. 3A and 3B. Alternatively, 50% or 33% RZ carvers may be used to generate test signals. A 50% carver needs a full clock rate input, while 67% and 33% carvers operate with one-half clock rate input.

Figure 2:
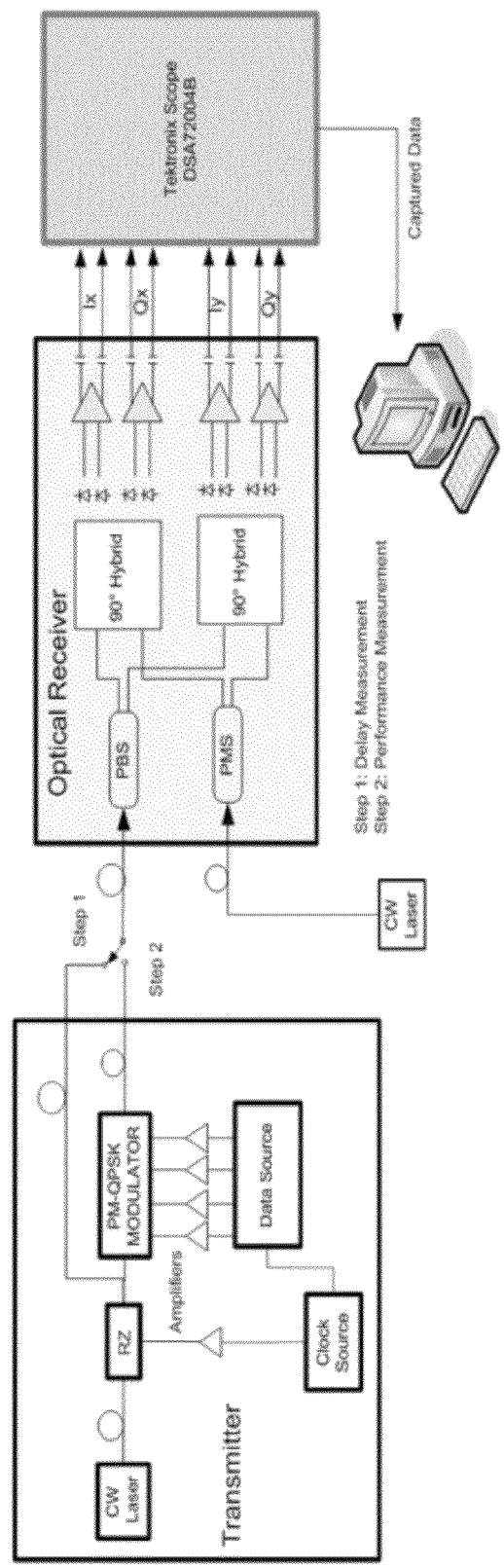
FIG. 2 is a block diagram of an experimental set-up used to demonstrate the technologies disclosed in this specification.

In FIG. 2, "RZ" is a return-to-zero carver, "PM-QPSK" means polarization multiplexed—quadrature phase shift keying, "CW" means continuous wave, "PBS" is a polarizing beam splitter, and "PMS" is a polarization maintaining beam splitter. "Step 1" and "Step 2" label two positions of a switch. In position "Step 1" the output of an RZ carver provides an optical test signal for a receiver for skew (equivalently "delay") measurements. In position "Step 2" a PM-QPSK modulator creates an optical data signal for receiver performance testing.

In the system of FIG. 2, a four-channel 50 Gs/s scope with variable skew control for each channel monitors I and Q output for X and Y polarizations of an optical QPSK receiver. In an experiment, time delays between I and Q signals in the receiver for both X and Y polarizations were calibrated according to equation (10) above with the switch in position "Step 1". Next, with the switch in position "Step 2", a real-time 126 Gb/s signal was introduced to the receiver input and data were collected in the scope. A two-dimensional parameter scan (i.e. X-polarization I-Q skew and Y-polarization I-Q skew) was performed around the zero delay position. Data for each point was recorded and processed using offline computation including timing recovery followed by equalization with a 64-tap half-symbol-spaced adaptive equalizer. This procedure was repeated twice: once in a back-to-back configuration (without an optical transmission line) and once for an optical transmission line having 1,700 ps/nm dispersion.

Figure 3:
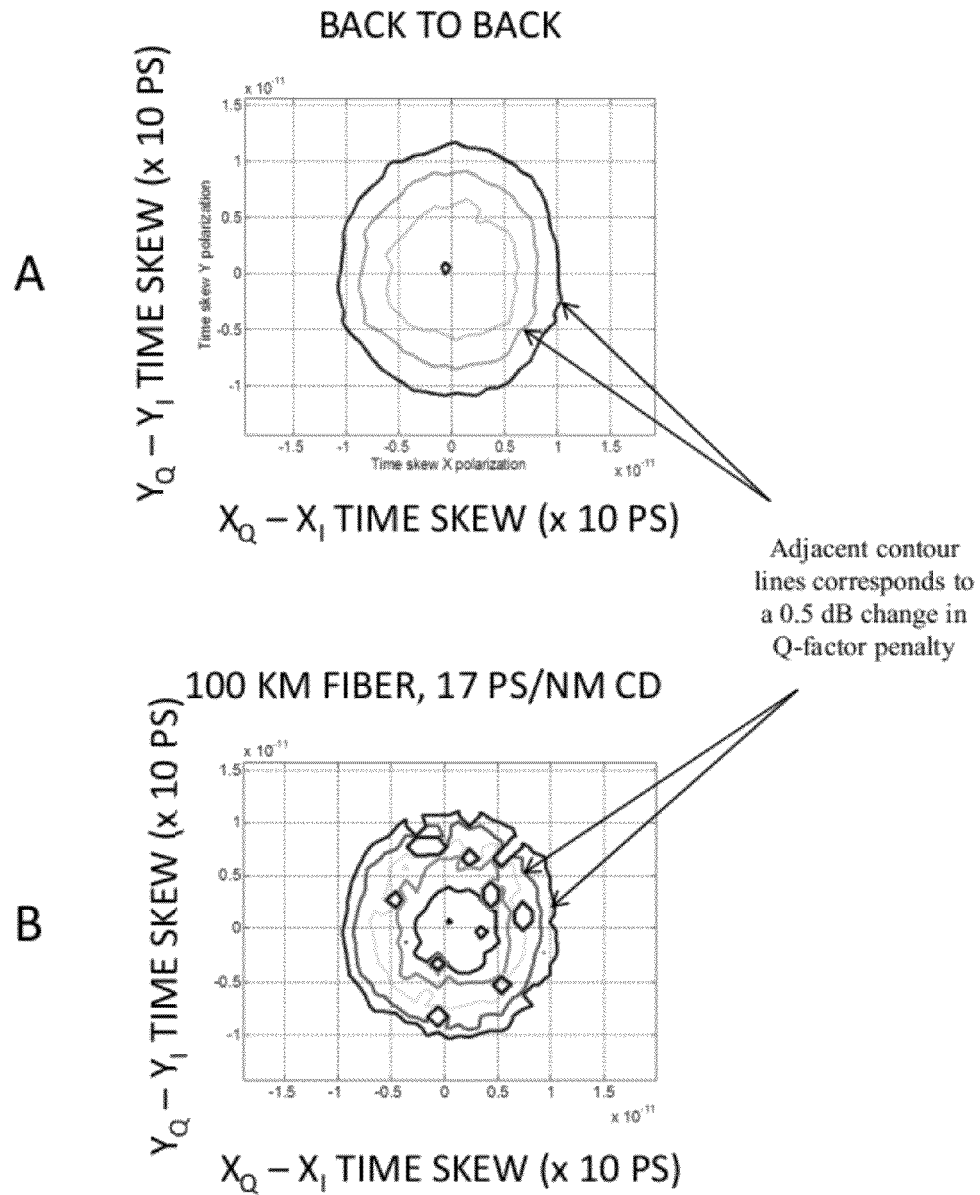
FIGS. 3A and 3B show contour plots of Q-factor penalty versus I-Q skew in X and Y polarizations and represent experimental results obtained with the experimental set-up described in connection with FIG. 2.

FIGS. 3A and 3B show contour plots of Q-factor penalty versus I-Q skew in X and Y polarizations of a dual-polarization, quadrature phase shift keying (DP-QPSK) coherent optical receiver. FIG. 3A shows results for back-to-back transmission while FIG. 3B shows results for transmission through 100 km of fiber with 1,700 ps/nm chromatic dispersion. In FIGS. 3A and 3B the axes are time skew between I and Q components for X and Y polarizations and the zero-skew point (i.e. the center of the graph) is determined according to equation (10) above.

The contours show that zero skew is the point of best bit-error-rate performance. Each contour line represents a 0.5 dB change in Q-factor penalty using bit-error-rate. The penalties are symmetric with respect to X and Y polarization components. For zero dispersion, 0.5 dB or less Q penalty is obtained for as much as 6 ps skew in one polarization only (6 ps in X, 0 ps in Y) or as much as 4 ps skew in X and Y polarizations (4 ps in X, 4 ps in Y). Dispersion increases sensitivity to skew: 0.5 dB penalty is obtained for only 3 ps skew in one polarization only or as little as 2 ps skew in both polarizations when 1,700 ps/nm dispersion is present.

A method for determining the sign and magnitude of I/Q time skew in DP-QPSK optical receivers is based on correlating received test signals after filtering. Test signals may be generated from an RZ carver or using binary test data sequences. In communication systems, test data sequences may be interspersed with data from time to time to permit dynamic skew monitoring and correction. Such skew monitoring can be performed using the methods described above in this specification.

Figure 4:
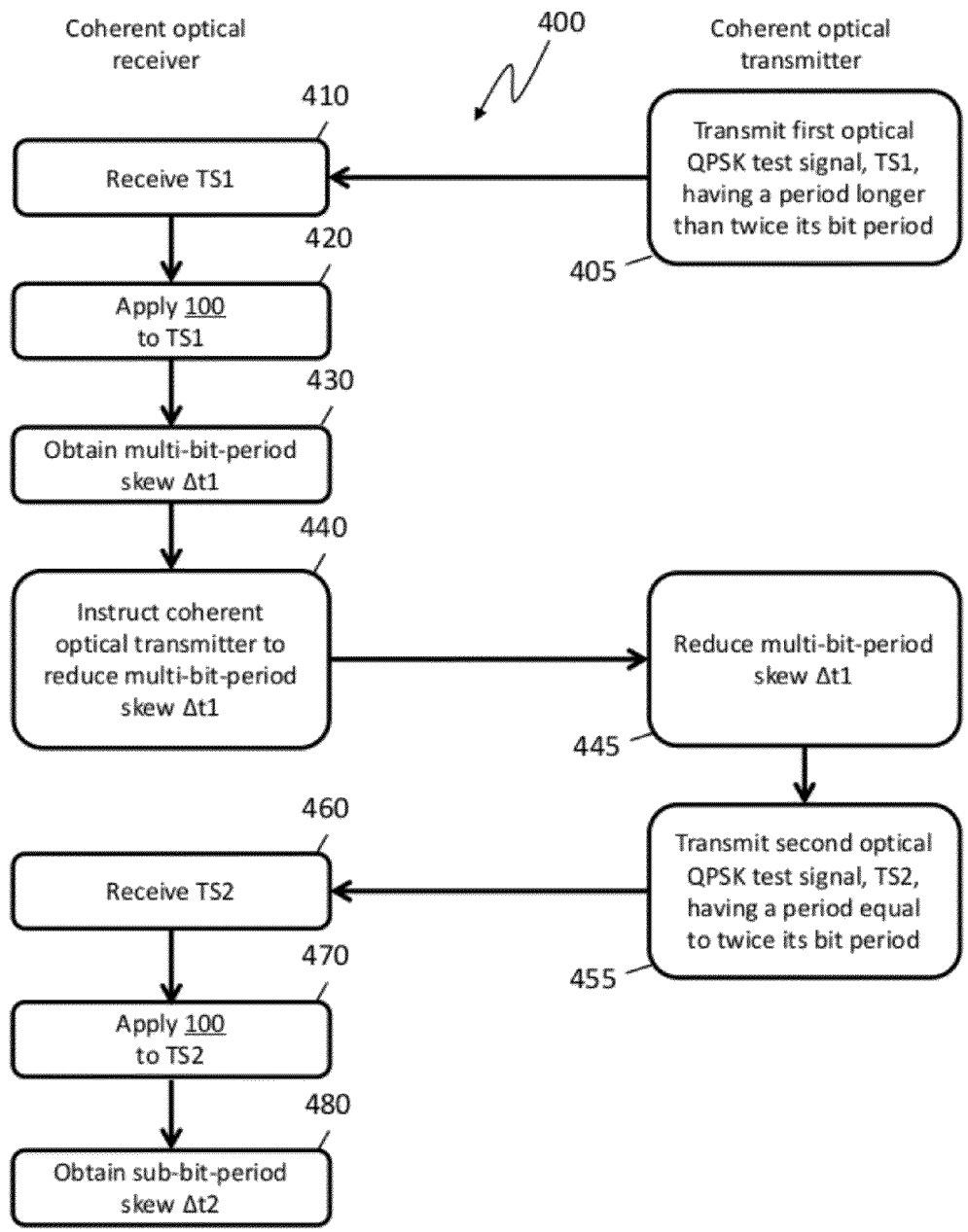
FIG. 4 is a schematic diagram of another system and method used to measure and adjust skew between quadrature components of a high-speed quadrature phase shift keying (QPSK) optical signal in a communication system.

FIG. 4 shows a flow chart for an example of a procedure 400 used to measure and adjust the skew in a communication system. At 405, a coherent optical transmitter transmits a first optical QPSK test signal having a period longer than twice its bit period. At 410, a coherent optical receiver receives the transmitted first optical QPSK test signal. At 420, the coherent optical receiver applies the method 100, described above in connection with FIG. 1, to the received first optical QPSK test signal. At 430, the coherent optical receiver obtains, as a result of applying the method 100 to the first optical QPSK test signal, multi-bit-period skew between the I and Q components of the first optical QPSK test signal. At 440, in response to having obtained the multi-bit-period skew, the coherent optical receiver instructs the coherent optical transmitter to reduce the multi-bit-period skew between the I and Q components of transmitted optical QPSK signals. For example, such instruction can be transmitted, to the coherent optical transmitter by the coherent optical receiver, via a feedback signal.

At 445, the coherent optical transmitter reduces, responsive to the instruction from the coherent optical receiver, the multi-bit-period skew of the transmitted optical QPSK signals. At 455, the coherent optical transmitter transmits, as a result of reducing the multi-bit-period skew, a second optical QPSK test signal having a period equal to twice its bit period. At 460, the coherent optical receiver receives the transmitted second optical QPSK test signal. At 470, the coherent optical receiver applies the method 100, described above in connection with FIG. 1, to the received second optical QPSK test signal. At 480, the coherent optical receiver obtains, as a result of applying the method 100 to the second optical QPSK test signal, sub-bit-period skew between the I and Q components of the second optical QPSK test signal. In this fashion, the coherent optical receiver can monitor either multi or sub-bit-period skew of optical QPSK test signals received from the coherent optical transmitter.

The disclosed methods can detect not only skew present in received optical signals such as $S_R$ (120 in FIG. 1), but also skew that may be present in the electronics of a digital receiver. Skew that originates in transimpedance amplification or analog-to-digital conversion, as examples, may be detected by the methods described above in this specification.

Implementations of the subject matter and the operations described in this document can be configured in digital electronic circuitry, or in computer software, or firmware, along with optical components disclosed in this document and their structural equivalents, or in combinations of one or more of them. For a hardware implementation, the embodiments (or modules thereof) can be implemented within one or more application specific integrated circuits (ASICs), mixed signal circuits, digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described herein, or a combination thereof.

When the embodiments are implemented in software, firmware, middleware or microcode, program code or code segments, they can be stored in a machine-readable medium (or a computer-readable medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents.

Implementations of the subject matter described in this document can be configured as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this document contains many specific implementation details, these should not be construed as limitations on the scope of any inventions or of what may be claimed, but rather as descriptions of features specific to particular implementations of particular inventions. Certain features that are described in this document in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The above description of the disclosed embodiments is provided to enable any person skilled in the art to make or use the disclosure. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for detecting time skew between in-phase (I) and quadrature (Q) components of a quadrature phase shift keying (QPSK) signal comprising:
   at a coherent optical receiver, receiving an optical QPSK test signal;
   mixing the optical QPSK test signal with an oscillator signal, generated by an oscillator local to the coherent optical receiver, said mixing to produce a detected signal;
   sampling I and Q components of the detected signal with analog to digital converters and computing Fourier transforms of the I and Q components;
   filtering the Fourier transformed I and Q components; and
   correlating the filtered I and Q components to obtain the time skew as a result of said correlating,
   wherein the optical QPSK test signal comprises a first test signal having a first period longer than twice its bit period and a second test signal having a second period equal to twice its bit period, and where said receiving, said mixing, said sampling, said filtering and said correlating are performed
      on the first test signal to resolve multi-bit-period skew, and
      on the second test signal to resolve sub-bit-period skew.

2. The method of claim 1, the optical QPSK test signal having a sinusoidal envelope.

3. The method of claim 2, the optical QPSK test signal being generated by a continuous-wave optical source modulated by a nominal 67% return-to-zero carver operating at half a bit rate of the test signal.

4. The method of claim 2, the optical QPSK test signal being generated by a continuous-wave optical source modulated by a nominal 33% return-to-zero carver operating at half a bit rate of the test signal.

5. The method of claim 2, the optical QPSK test signal being generated by a continuous-wave optical source modulated by a nominal 50% return-to-zero carver operating at a bit rate of the test signal.

6. The method of claim 2, the filtering being low pass filtering that removes a sum frequency of an offset frequency between the QPSK and local oscillator signals and the frequency of the sinusoidal envelope.

7. The method of claim 2, the filtering being high pass filtering that removes a difference frequency of an offset frequency between the QPSK and local oscillator signals and the frequency of the sinusoidal envelope.

8. The method of claim 1, the optical QPSK test signal being generated by a bit pattern of alternating 0 and 1 bits.

9. The method of claim 1, the first test signal being generated by a pattern of 0 and 1 bits, a period of the pattern being twice the bit period.

10. The method of claim 1, where the first test signal is a pattern of 0 and 1 bits, the period of the pattern being an integer times the bit period, where the integer is greater than one.

11. The method of claim 1, where the second test signal is a bit pattern of alternating 0 and 1 bits.

12. The method of claim 1, where
    the first test signal is a polarization multiplexed, quadrature phase shift keying (PM-QPSK) signal, and where said receiving, said mixing, said sampling, said filtering and said correlating are performed
       on a first polarization of the first test signal to obtain the time skew associated with the first polarization of the first test signal, and
       on a second polarization of the first test signal to obtain a second time skew associated with the second polarization of the first test signal, and
    the second test signal is another polarization multiplexed, quadrature phase shift keying (PM-QPSK) signal, and where said receiving, said mixing, said sampling, said filtering and said correlating are performed on a first polarization of the second test signal to obtain a third time skew associated with the first polarization of the second test signal, and on a second polarization of the second test signal to obtain a fourth time skew associated with the second polarization of the second test signal.

13. The method of claim 12, where the first and second polarizations are orthogonal.

14. The method of claim 1, further comprising instructing a coherent optical transmitter to reduce the multi-bit-period skew via a feedback signal.

* * * * *